United States Patent
Kawabata et al.

(10) Patent No.: US 9,422,930 B2
(45) Date of Patent: Aug. 23, 2016

(54) REFRIGERANT COMPRESSOR

(75) Inventors: Hirotaka Kawabata, Kanagawa (JP);
Hironari Akashi, Kanagawa (JP);
Kazuhiro Yokota, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1241 days.

(21) Appl. No.: 10/586,173

(22) PCT Filed: Dec. 8, 2005

(86) PCT No.: PCT/JP2005/022991
§ 371 (c)(1),
(2), (4) Date: Jul. 17, 2006

(87) PCT Pub. No.: WO2006/062245
PCT Pub. Date: Jun. 15, 2006

(65) Prior Publication Data
US 2008/0253909 A1    Oct. 16, 2008

(30) Foreign Application Priority Data

Dec. 8, 2004  (JP) ................................. 2004-355148
Dec. 8, 2004  (JP) ................................. 2004-355150

(51) Int. Cl.
*F04B 39/00*    (2006.01)
*F04B 39/02*    (2006.01)
(Continued)

(52) U.S. Cl.
CPC .............. *F04B 39/023* (2013.01); *C09K 5/042* (2013.01); *F04B 39/0215* (2013.01); *F25B 31/023* (2013.01); *F25B 9/006* (2013.01); *F25B 2400/12* (2013.01)

(58) Field of Classification Search
CPC .... F04B 39/023; F04B 39/0215; F04B 9/006; C09K 5/042

USPC ....................... 252/67, 68; 184/6.16
See application file for complete search history.

(56) References Cited

U.S. PATENT DOCUMENTS 3,715,302 A * 2/1973 Mills et al. ...................... 208/14
3,759,817 A * 9/1973 Mills ............................... 208/14
(Continued)

FOREIGN PATENT DOCUMENTS

EP    0 846 749 A1    6/1998
EP    1 225 334 A1    7/2002
(Continued)

OTHER PUBLICATIONS

International Search Report for PCT/JP2005/022991, dated Jul. 3, 2006.

*Primary Examiner* — Charles Freay
*Assistant Examiner* — Christopher Bobish
(74) *Attorney, Agent, or Firm* — RatnerPrestia

(57) ABSTRACT

The present invention provides a refrigerant compressor which may assure excellent reliability while using low-viscosity refrigerant. The refrigerant compressor is characterized in that the viscosity of oil stored in hermetic container ranges from VG3 to VG8, and the boiling component at 350° C. or over is not less than 10% and not higher than 30% in volume ratio, and the boiling component at 300° C. or less is not less than 50% and not higher than 70% in volume ratio. Accordingly, the input reduction at sliding surfaces can be realized, and the lubricant is evaporated, therefore it is possible to prevent defective compression caused by PET (polyethylene phthalate) or the like deposited on the surfaces of the discharge reed and the like, and to enhance the efficiency and reliability.

8 Claims, 14 Drawing Sheets

(51) Int. Cl.
*C09K 5/04* (2006.01)
*F25B 31/02* (2006.01)
*F25B 9/00* (2006.01)

(56) References Cited

U.S. PATENT DOCUMENTS

| | | | |
|---|---|---|---|
| 4,101,414 A * | 7/1978 | Kim et al. | 208/18 |
| 4,252,506 A * | 2/1981 | Hannibal | 417/419 |
| 4,983,313 A * | 1/1991 | Kaneko et al. | 252/68 |
| 5,108,634 A * | 4/1992 | Seiki | 508/584 |
| 5,355,695 A * | 10/1994 | Kawaguchi et al. | 62/498 |
| 5,502,263 A * | 3/1996 | Ponsford et al. | 585/241 |
| 5,542,266 A | 8/1996 | Suzuki et al. | |
| 5,704,216 A | 1/1998 | Hirano et al. | |
| 5,939,200 A * | 8/1999 | Amano et al. | 428/423.1 |
| 6,054,224 A * | 4/2000 | Nagai et al. | 428/480 |
| 6,476,120 B1 * | 11/2002 | Bowers | 524/546 |
| 6,940,204 B2 * | 9/2005 | Yamazaki et al. | 310/208 |
| 7,404,701 B2 * | 7/2008 | Kwon et al. | 417/417 |
| 2004/0191094 A1 * | 9/2004 | Kojima et al. | 417/415 |
| 2006/0166844 A1 * | 7/2006 | Egawa et al. | 508/579 |

FOREIGN PATENT DOCUMENTS

| | | |
|---|---|---|
| JP | 06-184576 A | 7/1994 |
| JP | 10-204458 A | 8/1998 |
| JP | 2000-297753 A | 10/2000 |
| JP | 2002-156165 A | 5/2002 |
| WO | WO 2004/057187 A1 | 7/2004 |

* cited by examiner

REFRIGERANT COMPRESSOR

THIS APPLICATION IS A U.S. NATIONAL PHASE APPLICATION OF PCT INTERNATIONAL APPLICATION PCT/JP2005/022991.

TECHNICAL FIELD

The present invention relates to a refrigerant compressor used in a refrigerator, air conditioner, refrigerating apparatus, etc.

BACKGROUND ART

As for a conventional refrigerant compressor of this type, the development of a high-efficiency refrigerant compressor which consumes less quantity of fossil fuel has been promoted from the viewpoint of global environment protection. Particularly, special efforts are made to lower the lubricant viscosity and to decrease the sliding loss. Such a conventional refrigerant compressor is, for example, disclosed in Japanese Patent Laid-open Application No. 2000-297753 and Japanese Patent Laid-open Application No. H10-204458.

A conventional rotary compressor will be described in the following with reference to the drawings.

FIG. 14 is a sectional view of a closed type electric refrigerant compressor based on prior art. FIG. 15 is an enlarged view of portion E of the prior art. Hermetic container 1 stores oil 2 that is mineral oil ranging from VG15 to VG20 in viscosity, which also accommodates electric motor 5 that is a motor element formed of stator 3 and rotor 4, and reciprocating compression mechanism 6 driven by the motor. Also, the refrigerant used is R600a.

Next, the detail of compression mechanism 6 is described in the following.

Crank shaft 7 comprises main shaft 8 with rotor 4 press-fitted therein and eccentric member 9 formed eccentrically of main shaft 8, which is furnished with oil feeding pump 10. Cylinder block 11 includes compression chamber 13 formed of generally cylindrical bore 12, and bearing 14 which supports main shaft 8.

Piston 15 movably fitted in bore 12 is connected to eccentric member 9 via piston pin 16 by means of a connecting means, connecting rod 17.

Valve plate 20 is disposed so as to seal the end of bore 12, thereby forming suction hole 24 and discharge hole 25. Suction reed 18 formed from plate-spring material is held between the end of bore 12 and valve plate 20, and serves to open and close the suction hole. Discharge reed 19 formed from plate-spring material is disposed at the opposite to bore 12 side of valve plate 20, and serves to open and close the discharge hole. Head 21 is fixed at the opposite to bore 12 side of valve plate 20, thereby forming high pressure chamber 26 which accommodates discharge reed 19.

Suction tube 22 is fixed on hermetic container 1 and is connected to the low pressure side (not shown) of the refrigeration cycle, which leads the refrigerant (not shown) into hermetic container 1. Suction muffler 23 is held between valve plate 20 and head 21.

Sliding surfaces are respectively formed between main shaft 8 of crank shaft 7 and bearing 14, between piston 15 and bore 12, between piston pin 16 and connecting rod 17, between eccentric member 9 of crank shaft 7 and connecting rod 17.

A series of operations in the configuration above mentioned will be described in the following.

The power supplied from a commercial power source (not shown) is supplied to electric motor 5, which rotates rotor 4 of electric motor 5. Rotor 4 rotates crank shaft 7, and the eccentric motion of eccentric member 9 is transmitted from the connecting means, connecting rod 17, to drive the piston 15 via piston pin 16, and thereby, piston 15 reciprocates in bore 12.

And, the refrigerant gas led into hermetic container 1 through suction tube 22 opens the suction reed 18 via suction muffler 23 and is sucked up into compression chamber 13 from suction hole 24. The refrigerant gas taken into compression chamber 13 is continuously compressed, and opens the discharge reed 19 and is discharged from discharge hole 25 into high pressure chamber 26, which is then delivered to the high pressure side (not shown) of the refrigeration cycle.

Oil 2 is fed from oil feeding pump 10 to each sliding surface as crank shaft 7 is rotated, lubricating the sliding surfaces and decreasing the friction coefficient, and also serves the function as a seal between piston 15 and bore 12.

Also, in order to suppress the deposition of PET (polyethylene terephthalate) or the like contained in oil 2, the boiling point component at 400° C. or over of oil 2 is 20% or over in volume ratio.

DISCLOSURE OF THE INVENTION

A refrigerant compressor, comprising:
a hermetic container which internally stores oil and also accommodates a compression mechanism for compressing refrigerant gas,
wherein the oil ranges from not lower than VG3 to not higher than VG8 in viscosity.

DETAILED DESCRIPTION OF THE PREFERRED EMBODIMENTS

Figure 1:
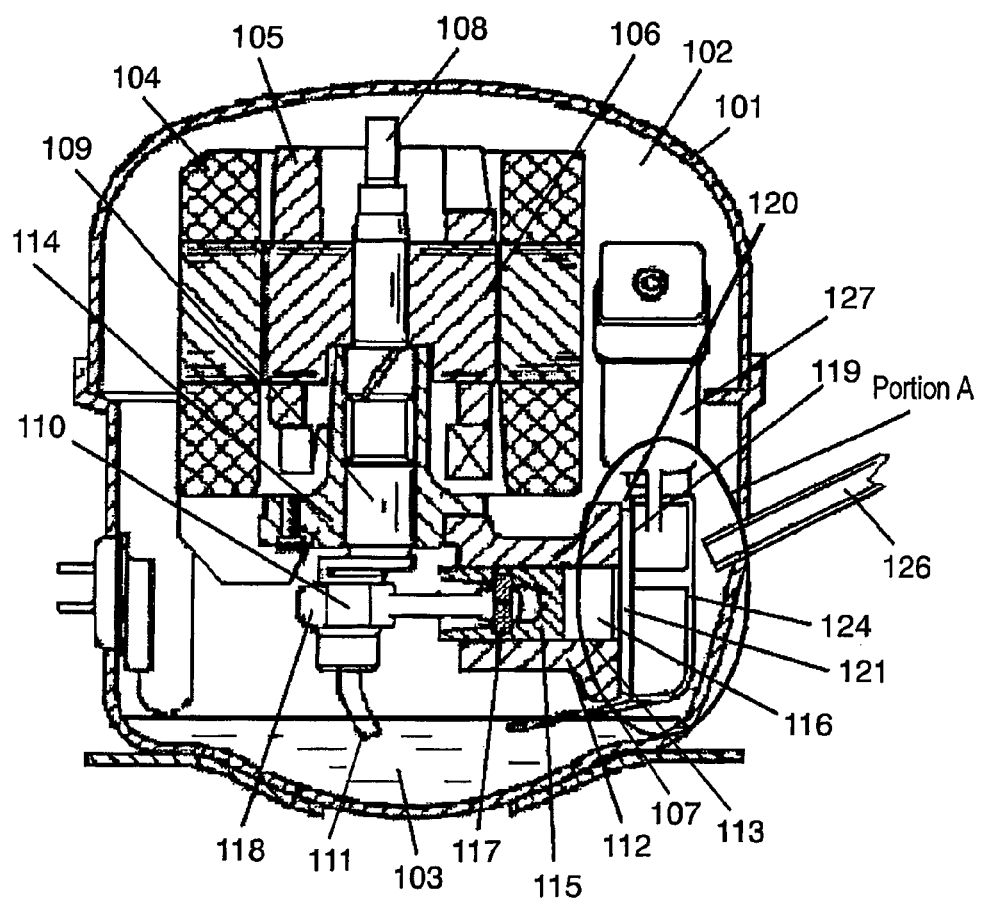
FIG. 1 is a sectional view of a refrigerant compressor in the preferred embodiment 1 of the present invention.

In the case of conventional oil 2 whose boiling component at 400° C. or over is 20% or over in volume ratio, the viscosity is VG12 or over and it is unable to further enhance the efficiency by decreasing the viscosity.

Further, if the viscosity is decreased for the purpose of enhancing the efficiency, the oil will become smaller in molecular weight, giving rise to easier extraction of oligomer such as PET (polyethylene terephthalate) or the like used in the electric motor and the like. Moreover, decreasing the viscosity will cause the boiling point to be lowered, and particularly, if the viscosity is decreased to VG10 or less, the oil is liable to evaporate for example at the discharge reed where the temperature becomes high, and then PET (polyethylene terephthalate) or the like in the oil will be deposited on the surface of the discharge reed. The deposit is carbonized at high temperatures and accumulated in the form of oil sludge, affecting the sealing effect of the discharge reed, and there arises a problem of defective compression.

Also, when R600a is used as the refrigerant, the pressure at the lower pressure side is often lowered to the atmospheric pressure, and also, a large cylinder capacity is employed in many cases in order to assure the capacity of the compressor. Accordingly, the pressure in the compression chamber is greatly decreased and the oil becomes more liable to evaporate, giving rise to easier deposition of PET (polyethylene terephthalate) or the like at the bore side of the suction reed and valve plate, affecting the sealing effect of the suction reed, and there arises a problem of defective compression.

The present invention is intended to solve such a conventional problem, and the object is to provide a refrigerant compressor using low viscosity oil which may assure high efficiency and excellent reliability.

In order to solve the above conventional problem, the refrigerant compressor of the present invention is characterized in that the oil stored in a hermetic container ranges from VG3 to VG8 in viscosity for achieving the purpose of decreasing the input, and the boiling point component at 350° C. or over of the oil is in a range from 10% to 30% in volume ratio, and the boiling point component at 300° C. or less is in a range from not less than 50% to not higher than 70% in volume ratio, and thereby, it is possible to prevent PET (polyethylene terephthalate) or the like extracted in the lubricant due to evaporation of the lubricant at the discharge reed or the like from being deposited on the surface of the discharge reed or the like.

In the refrigerant compressor of the present invention, the purpose of decreasing the input is achieved by lowering the oil viscosity, and by regulating the concentration of the boiling point component of the oil, the generation of sludge such as PET (polyethylene terephthalate) can be prevented, and it is possible to provide a refrigerant compressor which may assure high efficiency and excellent reliability.

The present invention comprises a hermetic container which internally stores oil and also accommodates a compression mechanism for compressing refrigerant gas. Since the viscosity of the oil ranges from VG3 to VG8, the friction coefficient at sliding surfaces is lowered and the input is decreased, and thereby, it is possible to provide a refrigerant compressor which may assure high efficiency.

Also, in the present invention, since the boiling point component at 350° C. or over of the oil is in a range from 10% to 30% in volume ratio, and the boiling point component at 300° C. or less is in a range from not less than 50% to not higher than 70% in volume ratio, it is possible to prevent PET (polyethylene terephthalate) or the like contained in the lubricant due to evaporation of the lubricant at the discharge reed or the like from being deposited on the surface of the discharge reed or the like. Accordingly, wear of sliding members and generation of sludge such as PET (polyethylene terephthalate) due to evaporation of the lubricant can be prevented, and it is possible to provide a refrigerant compressor which may assure high efficiency and excellent reliability.

Also, in the present invention, the refrigerant used is R600a or a mixture based on R600a, and the oil used is mineral oil or synthetic oil. Accordingly, even in combination with a refrigerant being easy to dissolve in the oil and to evaporate, sludge such as PET (polyethylene terephthalate) can be prevented from being generated, and it is possible to provide a refrigerant compressor which may assure high efficiency and excellent reliability.

Also, in the refrigerant compressor of the present invention, phosphoric extreme-pressure additive is added to the oil, and even in case the oil film is reduced in thickness because of using low-viscosity oil, the wear resistance is improved due to the extreme-pressure effect of phosphoric extreme-pressure additive. Accordingly, it is possible to further enhance the reliability.

Also, in the refrigerant compressor of the present invention, the compression mechanism used is a reciprocating compression mechanism, and even in case the amount of oil circulated is little, the evaporation of lubricant at the discharge reed is prevented, and thereby, the performance can be prevented from lowering, and it is possible to enhance the reliability while using low-viscosity oil.

Also, the present invention comprises an electric motor for driving the compression mechanism, wherein the insulating material used for the electric motor is a low-oligomer type insulating material. Accordingly, since the friction coefficient at sliding surfaces is reduced, the input can be decreased, and in addition, the quantity of oligomer extracted is suppressed, and it is possible to provide a refrigerant compressor which may assure high efficiency and excellent reliability.

Also, in the present invention, since the oil used is a single oil nearly equal in evaporation temperature, general-purpose type oil can be used, and it is possible to provide an inexpensive compressor.

Also, in the present invention, the electric motor used is a distributed winding motor, and just by using low-oligomer type film as interlayer insulating paper or slot insulating paper, low viscosity oil ranging from not lower than VG3 to not higher than VG8 can be applied, and it is possible to provide a refrigerant compressor which may assure high efficiency and excellent reliability.

Also, in the present invention, the electric motor used is a concentrated winding motor, and just by using low-oligomer type insulating material as insulator for winding, low viscosity oil ranging from not lower than VG3 to not higher than VG8 can be applied, and it is possible to provide a refrigerant compressor Which may assure high efficiency and excellent reliability.

The preferred embodiments of the present invention will be described in the following with reference to the drawings. The present invention is not limited by the preferred embodiments.

Preferred Embodiment 1

Figure 2:
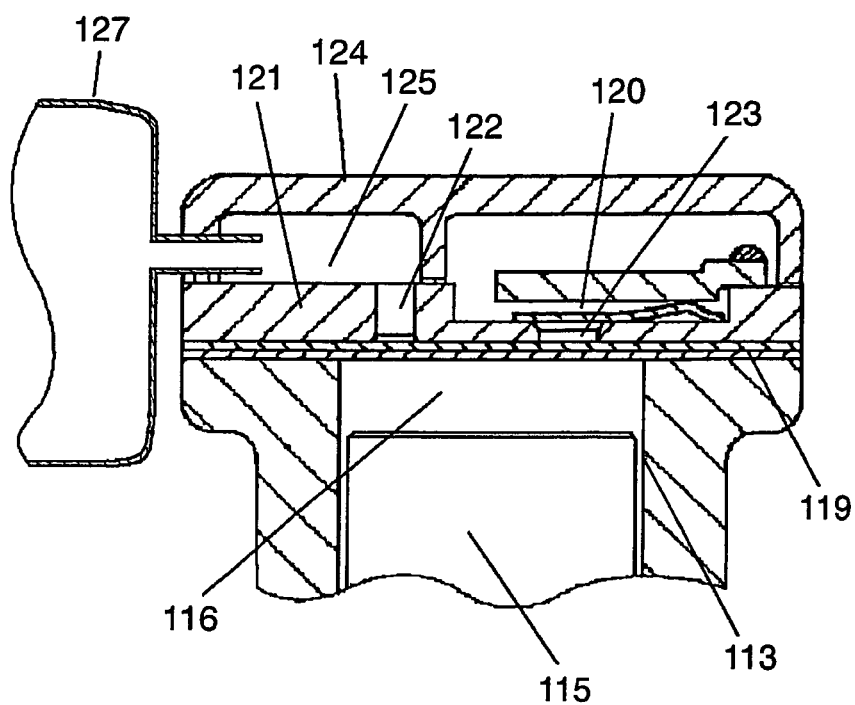
FIG. 2 is an enlarged sectional view of portion A in FIG. 1.
Figure 3:
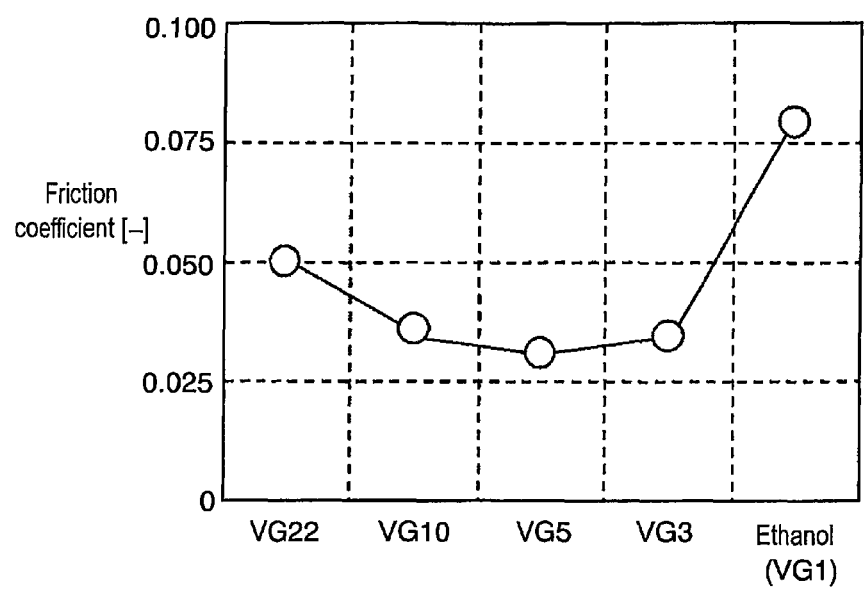
FIG. 3 is a characteristic chart of oil viscosity and friction coefficient.
Figure 4:
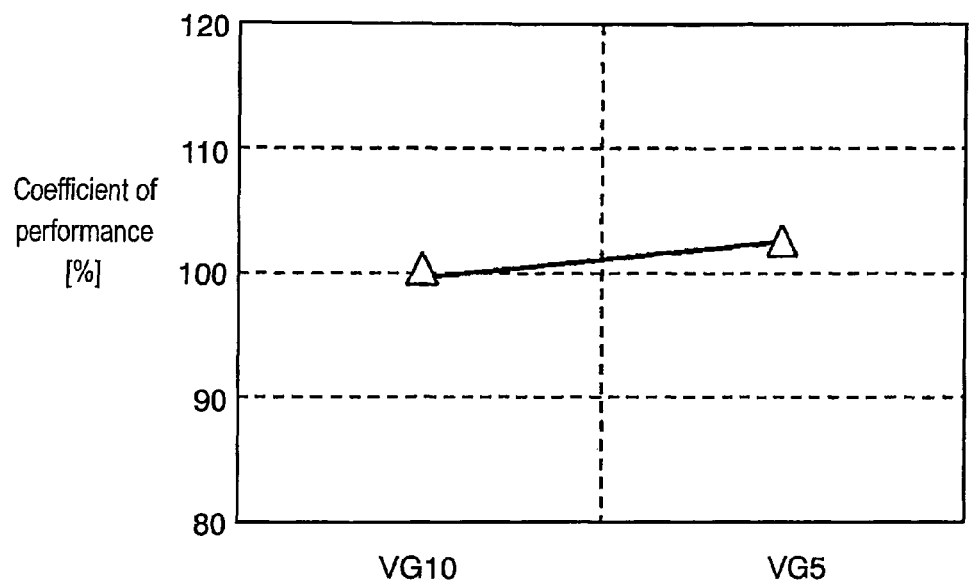
FIG. 4 is a characteristic chart of oil viscosity and compressor efficiency.

FIG. 1 is a sectional view of a refrigerant compressor in the preferred embodiment 1 of the present invention. FIG. 2 is an enlarged view of portion A in the preferred embodiment. FIG. 3 is a characteristic chart of oil viscosity and friction coefficient. FIG. 4 is a characteristic chart of oil viscosity and compressor efficiency.

In FIG. 1 and FIG. 2, hermetic container 101 is internally filled with refrigerant gas 102 formed of R600a, and at the bottom thereof, it stores mineral oil 103 of VG5 as lubricating oil whose boiling point component at 350° C. or over ranges from not less than 10% to not higher than 30% in volume ratio and boiling point component at 300° C. or less ranges from not less than 50% to not higher than 70% in volume ratio, which accommodates motor element 106 formed of stator 104 and rotor 105, and reciprocating compression mechanism 107 driven by the element. Mineral oil 103 is an example of oil, and it is also preferable to be synthetic oil.

The detail of compression mechanism 107 will be described in the following.

Crank shaft 108 is formed of main shaft 109 and eccentric member 110, and at the bottom end thereof, there is provided oil feeding pump 111 which is connected to mineral oil 103. Rotor 105 is press-fitted in main shaft 109. Eccentric member 110 is formed eccentrically of main shaft 109. Cylinder block 112 made of cast iron forms generally cylindrical bore 113 and bearing 114 which supports main shaft 109.

Piston 115 movably fitted in bore 113 is formed from a ferrous material, which forms compression chamber 116 together with bore 113 and is connected to eccentric member 110 by means of a connecting means, connecting rod 118, via piston pin 117. The end of bore 113 is sealed with suction reed 119, discharge reed 120, and valve plate 121.

Valve plate 121 is disposed so as to seal the end of bore 113, forming suction hole 122 and discharge hole 123. Suction reed 119 formed from plate-spring material is held between the end of bore 113 and valve plate 121, and serves to open and close the suction hole. Discharge reed 120 formed from plate-spring material is disposed at the opposite to bore 113 side of valve plate 121, and serves to open and close the discharge hole. Head 124 is fixed at the opposite to bore 113 side of valve plate 121, and forms high pressure chamber 125 which accommodates discharge reed 120.

Suction tube 126 is fixed on hermetic container 101 and also connected to the low pressure side (not shown) of the refrigeration cycle, which leads the refrigerant gas (not shown) into hermetic container 101. Suction muffler 127 having a noise reducing space is held between valve plate 121 and head 124, which communicates hermetic container 101 to suction hole 122.

Sliding surfaces are respectively formed between main shaft 109 and bearing 114, between piston 115 and bore 113, between piston pin 117 and connecting rod 118, between eccentric member 110 and connecting rod 118.

The operation of a refrigerant compressor having the above configuration will be described in the following.

The power supplied from a commercial power source (not shown) is supplied to motor element 106, which rotates rotor 105 of motor element 106. Rotor 105 rotates crank shaft 108, and the eccentric motion of eccentric member 110 is transmitted from the connecting means, connecting rod 118, to drive the piston 115 via piston pin 117, and thereby, piston 115 reciprocates in bore 113.

And, the refrigerant gas led into hermetic container 101 through suction tube 126 opens suction reed 119 via suction muffler 127 and is sucked up into compression chamber 116 from suction hole 122. The refrigerant gas sucked up into compression chamber 116 is continuously compressed to open the discharge reed 120 and is discharged from discharge hole 123 to high pressure chamber 125, which is then delivered to the high pressure side (not shown) of the refrigeration cycle.

As crank shaft 108 is rotated, mineral oil 103 is fed from oil feeding pump 111 to sliding surfaces formed between main shaft 109 and bearing 114, sliding surfaces formed between piston 115 and bore 113, sliding surfaces formed between piston pin 117 and connecting rod 118, and sliding surfaces formed between eccentric member 110 and connecting rod 118 for the purpose of lubrication, and the oil also serves the function as a seal between piston 115 and bore 113.

Here, friction coefficients in relation to oil viscosity in the present preferred embodiment will be described in the following by using FIG. 3.

The measurement in FIG. 3 includes the results of tests conducted by using ester oil ranging from not lower than VG3 to not higher than VG22 and ethanol equivalent to VG1 at atmospheric pressure 0.4 MPa of refrigerant HFC134a under the conditions of sliding speed at 1.0 m/s and surface pressure at 0.5 MPa.

In the results, no rise of the friction coefficient is observed even when the oil viscosity is lowered to VG5, and only slight rise of the friction coefficient is observed even with the oil viscosity lowered to VG3. However, rapid rise of the friction coefficient is observed when the viscosity is lowered to VG1 (ethanol).

This is probably because the friction coefficient rises with increase of metal contact due to lessening in thickness of the oil film generated when the viscosity is lowered to VG3 or less.

FIG. 4 shows the results of measuring the performance by using refrigerant R600a and mineral oil of VG5 and VG10 under the conditions of condensing temperature at 54.4° C., evaporation temperature at −23.3° C., and temperature before expansion valve of suction gas at 32.2° C.

In the results, it can be observed that the coefficient of performance (COP) rises when the oil viscosity is lowered to VG5. This is probably because the reduction of friction coefficient at sliding surfaces and the reduction of viscous resistance with lowering of oil viscosity from VG10 to VG5 greatly contribute to the input reduction of the refrigerant compressor.

Further, using oil of VG5 in viscosity and changing the boiling point component at 350° C. or over and the boiling point component at 300° C. or less of the oil, the comparison was made with respect to generation of sludge, and the results were evaluated through a continuous test performed by a reciprocating refrigerant compressor for 500 hours under the conditions of condensing temperature at 51° C. and evaporation temperature at −25° C.

Regarding the generation of sludge in the test using oil whose boiling point component at 350° C. or over is 5% in volume ratio and boiling point component at 300° C. or less is 50% in volume ratio, oil whose boiling point component at 350° C. or over is 12% in volume ratio and boiling point component at 300° C. or less is 70% in volume ratio, and oil whose boiling point component at 350° C. or over is 20% in volume ratio and boiling point component at 300° C. or less is 50% in volume ratio, the results of the comparison are as shown in Table 1.

Table 1

TABLE 1

|  | Boiling point component at 300° C. or less | Boiling point component at 350° C. or over | Generation of sludge |
|---|---|---|---|
| Volume ratio [%] | 50 | 5 | Yes |
|  | 70 | 12 | No |
|  | 50 | 20 | No |

In case the boiling point component at 350° C. or over is 30% or over, the oil viscosity is VG10 or over and it is unable to decrease the friction coefficient.

In this case, when refrigerant gas 102 sucked up into compression chamber 116 is compressed, refrigerant gas 102 in the high pressure chamber of head 124 rises in temperature, and mineral oil 103 contained in refrigerant gas 102 similarly rises in temperature. However, when the boiling point component at 350° C. or over is 10% to 30% in volume ratio, there is no evaporation of mineral oil 103 and it is possible to prevent organic materials such as PET (polyethylene phthalate) used for stator 104 or the like from being deposited on the surface of discharge reed 120 even in case such material is mixed in mineral oil 103. Accordingly, hindrance to the sealing effect of discharge reed 120 due to the deposition and resultant defective compression can be suppressed, and it is possible to enhance the reliability.

Further, when the boiling point component at 300° C. or less is not less than 50% and not higher than 70% in volume ratio, the oil viscosity is VG10 or less, and the friction coefficient can be decreased and the input can be reduced, enabling the enhancement of the efficiency.

Also, with the oil viscosity lowered, at the sliding surface between piston 115 and bore 113, and at the sliding surface between piston pin 117 and connecting rod 118, the mutual sliding speed becomes 0 m/s twice per compressing process. Then, the generated pressure of mineral oil 103 becomes zero, giving rise to emergence of such a state that solid contact easily takes place. However, adding phosphorous extreme-pressure additive to mineral oil 103, the extreme-pressure effect of the additive prevents the occurrence of adhesion in solid contact, and it is possible to improve the wear resistance and to enhance the reliability.

Also, the extreme-pressure effect of the additive is effective to almost all sliding surface materials. That is, it is of course possible to obtain similar effects not only in combination of ferrous materials but also in aluminum-based material or the like, those subjected to surface treatment such as nitriding, and combination of coating materials such as ceramics.

Also, the material mixed in mineral oil 103 is an organic material of PET (polyethylene phthalate) used as the insulating material of stator 104. However, as for other organic materials such as LCP (liquid crystal polymer compound) used for stator 104 and organic materials such as PBT (polybutylene phthalate) and PPS (polyphenylene sulfide) used for suction muffler 127, which are used for other component parts, it is also possible to obtain similar effects irrespective of extracted substances because the boiling point component at 350° C. or over of mineral oil 103 is not less than 10% and not higher than 30% in volume ratio and there is no evaporation at discharge reed 120.

Also, an example of combination of R600a and mineral oil has been described above, but similar effects can be obtained even when the refrigerant used is R290 that is hydrocarbon-based refrigerant or when the refrigerant is HFC-based refrigerant that is poor in lubrication property because there is no evaporation of mineral oil 103 at high temperatures. Further, the effect is specially very high in the case of $CO_2$ refrigerant that is high in condensing and evaporating pressure and liable to increase in temperature.

Described above is a compressor operated at a constant speed in the present preferred embodiment, but the operating speed of the refrigerant compressor is reduced with use of an inverter system, and particularly, in extra-low speed operation of less than 20 Hz, the amount of mineral oil 103 circulated becomes decreased and the temperature greatly rises at discharge reed 120, and therefore, the effect of the present invention naturally becomes remarkable.

Also, described above is an example of reciprocating refrigerant compressor in the present preferred embodiment, but it is of course possible to obtain similar effects even in the case of other compressors having sliding surfaces and discharge valves such as rotary type, scroll type, and vibration type.

Preferred Embodiment 2

Figure 5:
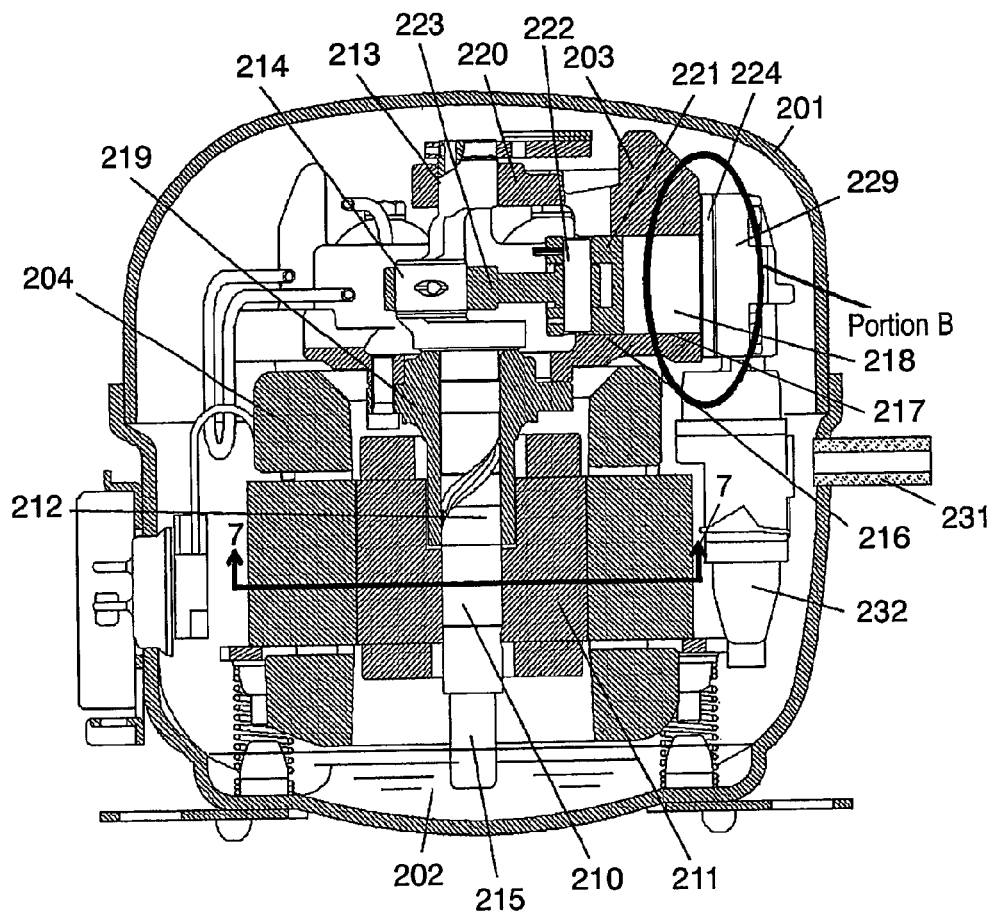
FIG. 5 is a sectional view of a refrigerant compressor in the preferred embodiment 2 of the present invention.
Figure 6:
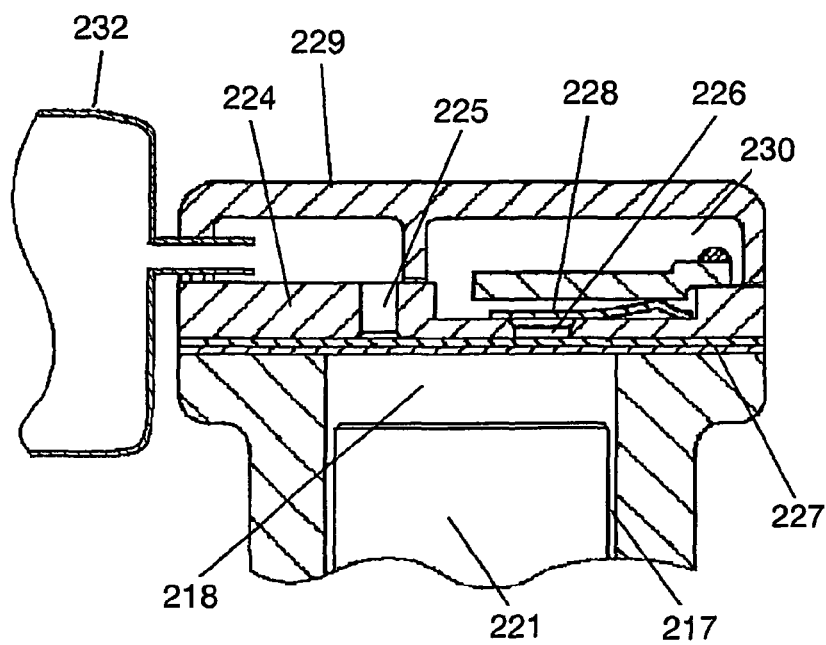
FIG. 6 is an enlarged view of portion B in FIG. 5.
Figure 7:
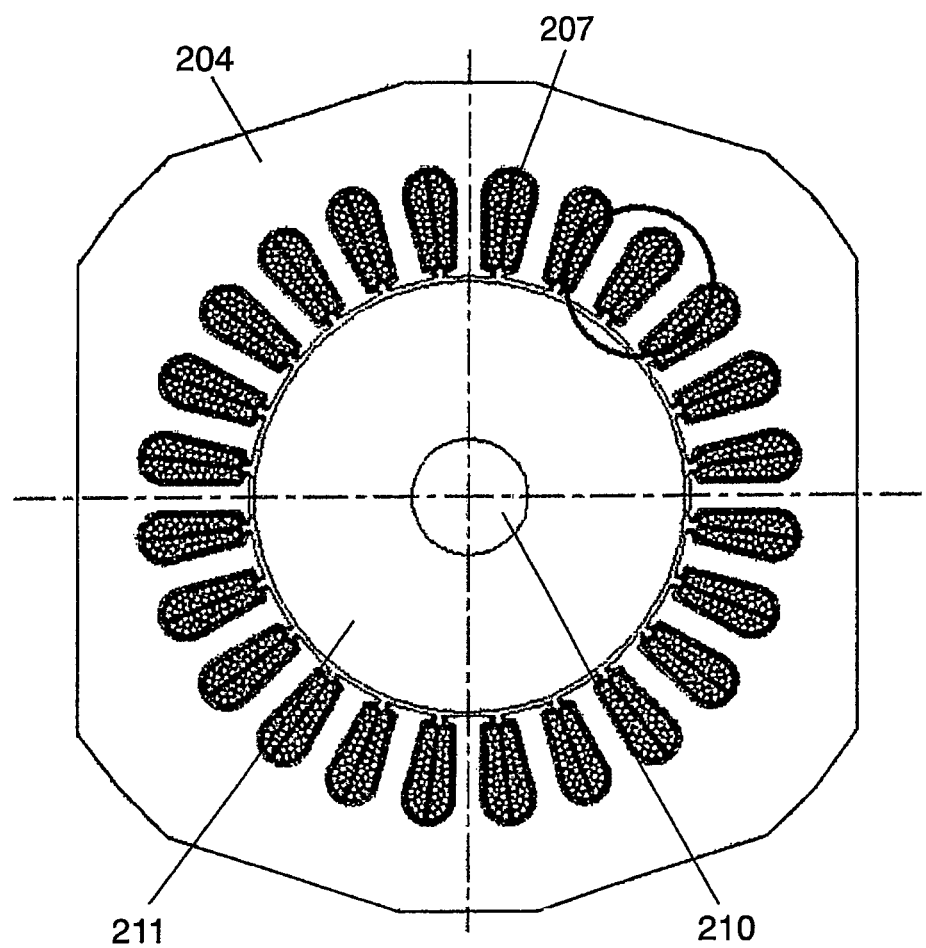
FIG. 7 is a sectional view along 7-7 in FIG. 5.
Figure 8:
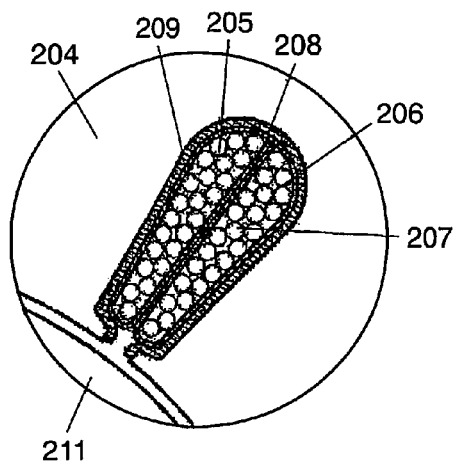
FIG. 8 is an enlarged view of an essential portion in FIG. 7.
Figure 9:
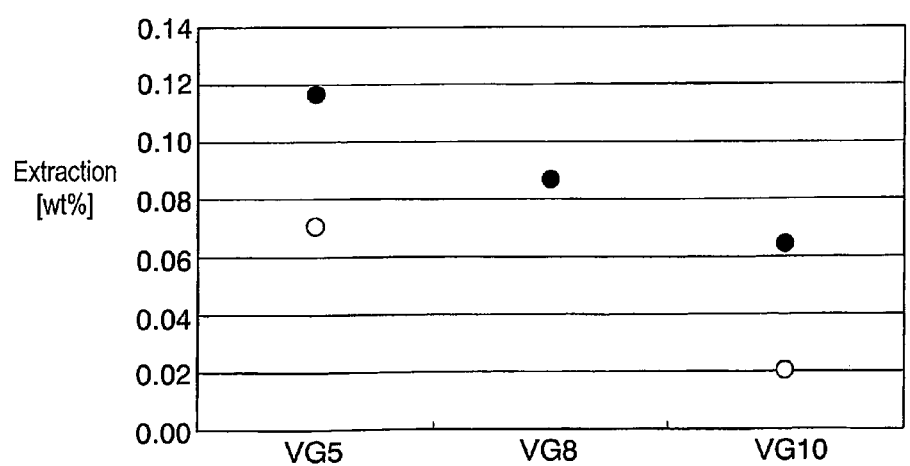
FIG. 9 is a characteristic chart of oil viscosity and oligomer extraction.

FIG. 5 is a schematic diagram of a refrigerant compressor in the preferred embodiment of the present invention. FIG. 6 is an enlarged view of portion B in FIG. 5. FIG. 7 is a sectional view along line 7-7 in FIG. 5. FIG. 8 is an enlarged view of an essential portion in FIG. 7. FIG. 9 is a characteristic chart of oil viscosity and oligomer extraction.

In FIG. 5 to FIG. 8, hermetic container 201 internally stores oil 202 of VG5 in viscosity which is formed of single mineral oil nearly equal in evaporation temperature, and also comprises compression mechanism 203 as a compressing element and distributed-winding induction type electric motor 204 as a motor element for driving compression mechanism 203. Also, R600a is used as refrigerant.

Electric motor 204 is configured in that main coil 205 in which the current supplied from a commercial power source (not shown) flows and sub-coil 206 in which the current flows only at start of the compressor are wound in such manner as to pass through slot 207. Main coil 205 and sub-coil 206 are respectively wound with interlayer insulating paper 208 that is an insulating material so that they will not come in contact with each other in slot 207, and slot insulating paper 209 is inserted at the inner wall of slot 207 in order to avoid its coming in contact with main coil 205 and sub-coil 206.

For interlayer insulating paper 208 and slot insulating paper 209, low-oligmer type film is used, which is 1.0 wt % or less in the amount of extraction when extracted for 48 hours by a Soxhlet extractor using xylene as extracting solvent.

Crank shaft 210 is formed of main shaft 212, sub-shaft 213, and eccentric member 214, and at the bottom thereof, there is provided oil feeding pump 215 connected to oil 202. Rotor 211 of electric motor 204 is press-fitted on main shaft 212. Eccentric member 214 is formed eccentrically of main shaft 212 between main shaft 212 and sub-shaft 213. Cylinder block 216 has compression chamber 218 formed of generally cylindrical bore 217, which also includes main bearing 219 supporting main shaft 212, and sub-bearing 220 supporting sub-shaft 213.

Piston 221 movably fitted in bore 217 is connected to eccentric member 214 by a connecting means, connecting rod 223, via piston pin 222.

Valve plate 224 is disposed so as to seal the end of bore 217, and formed with suction hole 225 and discharge hole 226. Suction reed 227 formed from plate-spring material is held between the end of bore 217 and valve plate 224, and serves to open and close the suction hole 225. Discharge reed 228 formed from plate-spring material is disposed at the opposite to bore side of valve plate 224, and serves to open and close the discharge hole 226. Head 229 is fixed at the opposite to bore side of valve plate 224, and forms high pressure chamber 230 which accommodates discharge reed 228.

Suction tube 231 is fixed on hermetic container 201 and is also connected to the low pressure side (not shown) of the refrigeration cycle in order to lead the refrigerant gas (not shown) into hermetic container 201. Suction muffler 232 is held between valve plate 224 and head 229.

Sliding surfaces are formed between main shaft 212 of crank shaft 210 and main bearing 219, between sub-shaft 213 and sub-bearing 220, between piston 221 and bore 217, between piston pin 222 and connecting rod 223, and between eccentric member 214 of crank shaft 210 and connecting rod 223.

The operation and effect of a compressor having the above configuration will be described in the following.

The power supplied from a commercial power source (not shown) is supplied to electric motor 204, which rotates rotor 211 of electric motor 204. Rotor 211 rotates crank shaft 210, and the eccentric motion of eccentric member 214 is transmitted from the connecting means, connecting rod 223, to drive the piston 221 via piston pin 222, and thereby, piston 221 makes a reciprocating motion in bore 217.

As piston 221 reciprocates in bore 217, the pressure in compression chamber 218 is lowered during the suction process, then the refrigerant gas led into hermetic container 201 through suction tube 231 opens the suction reed 227 via suction muffler 232 and is sucked up into compression chamber 218 from suction hole 225. The refrigerant gas sucked up into compression chamber 218 is continuously compressed and opens the discharge reed 228 and is discharged from discharge hole 226 into high pressure chamber 230, which is then delivered to the high pressure side (not shown) of the refrigeration cycle.

Oil 202 is fed from oil feeding pump 215 to each sliding surface as crank shaft 210 is rotated, which lubricates the sliding surfaces between main shaft 212 and main bearing 219, sliding surfaces formed between sub-shaft 213 and sub-bearing 220, sliding surfaces formed between piston 221 and bore 217, sliding surfaces formed between piston pin 222 and connecting rod 223, and sliding surfaces formed between eccentric member 214 and connecting rod 223, and also serves the function as a seal between piston 221 and bore 217.

When the viscosity of oil 202 used is VG5, the reduction of friction coefficient at sliding surfaces and the reduction of viscous resistance with lowering of the viscosity of oil 202 greatly contribute to the input reduction of the refrigerant compressor, thereby greatly improving the efficiency of the refrigerant compressor.

Also, oil 202 is splashed to hermetic container 201 and compression mechanism 203 from above the crack shaft 210, and part of the oil drips onto electric motor 204. Also, mist-like oil 202 exists in hermetic container 201, which sticks to the inner wall of hermetic container 201, compression mechanism 203, and electric motor 204.

Oil 202 dripped and adhered to electric motor 204, as shown in FIG. 9, extracts oligomer from PET (polyethylene phthalate) film used as interlayer insulating paper 208 and slot insulating paper 209, and the amount of oligomer extracted becomes more increased when oil 202 is lower in viscosity. The horizontal axis in FIG. 9 is viscosity, and the vertical axis is the amount of oligomer extracted. Also, ●-mark is common type oil, and ○-mark is low-oligomer type oil. However, since low-oligomer type PET (polyethylene phthalate) film is used as interlayer insulating paper 208 and slot insulating paper 209 of electric motor 204 used in the present preferred embodiment, the amount of oligomer extracted is suppressed even when low-viscosity oil 202 is used with respect to PET (polyethylene phthalate) film at atmospheric temperature 220° C. Therefore, even in case oil 202 is evaporated due to considerable decrease of the pressure in compression chamber 218, it is possible to suppress the deposition of oiligomer. Also, even when oil 202 is evaporated at discharge reed 228 or the like where the temperature becomes high, the deposition of oligomer can be similarly suppressed. As a result, defective compression causing hindrance to the sealing effects of suction reed 227 and discharge reed 228 can be suppressed and it is possible to enhance the reliability.

Also, low-oligomer type PET (polyethylene phthalate) film is used as interlayer insulating paper 208 and slot insulating paper 209 of electric motor 204, but even with use of PEN (polyethylene naphthalate) film, it is possible to suppress the amount of oligomer extracted, and similar effects can be obtained.

Preferred Embodiment 3

Figure 10:
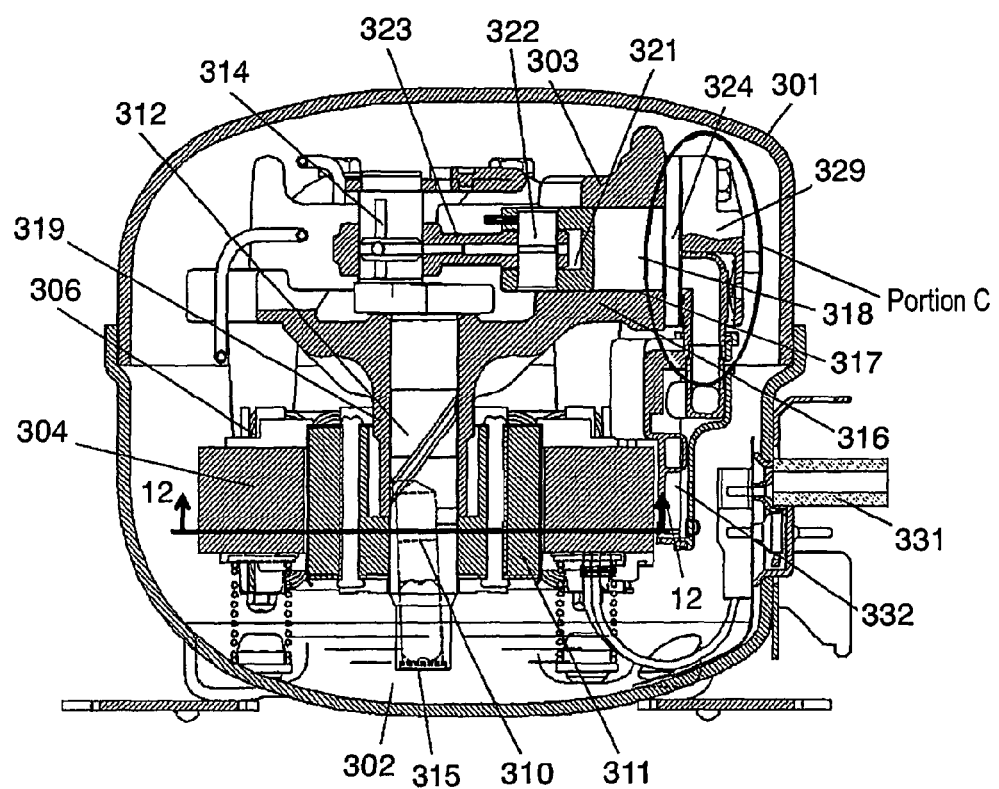
FIG. 10 is a sectional view of a refrigerant compressor in the preferred embodiment 3 of the present invention.
Figure 11:
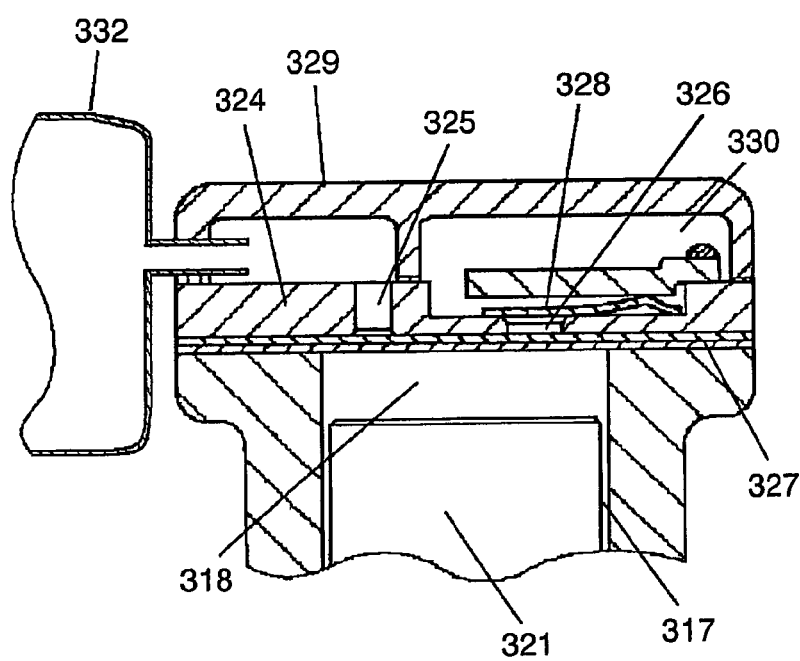
FIG. 11 is an enlarged view of portion C in FIG. 10.
Figure 12:
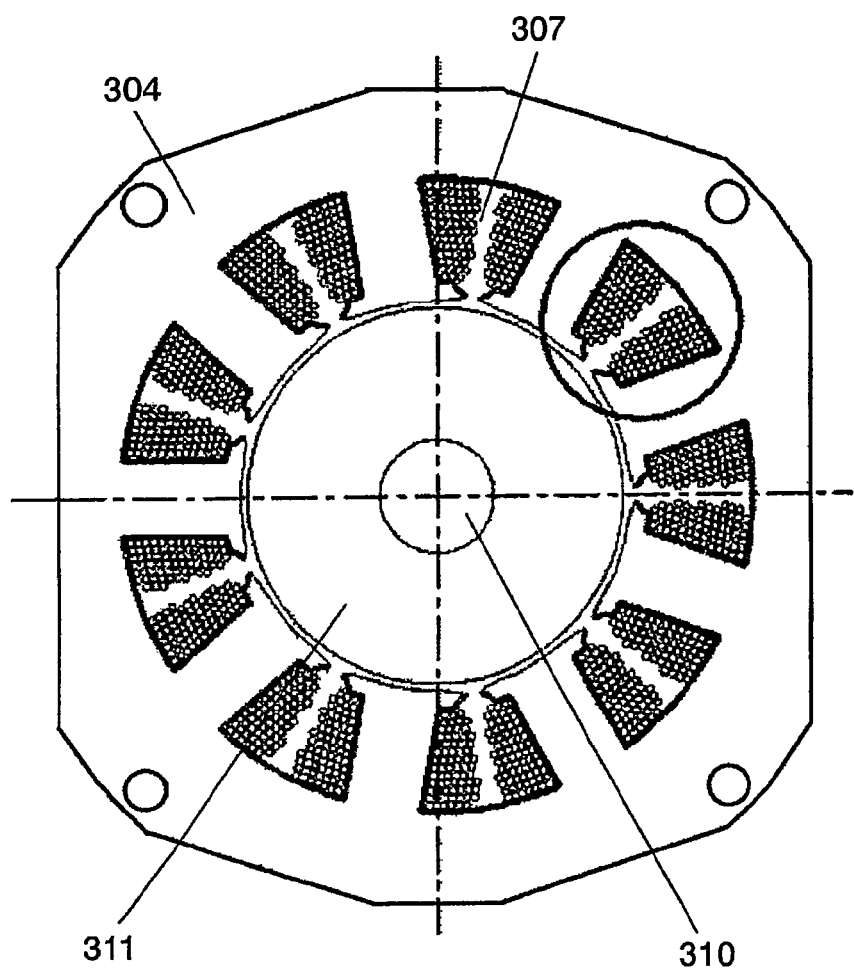
FIG. 12 is a sectional view along 12-12 in FIG. 10.
Figure 13:
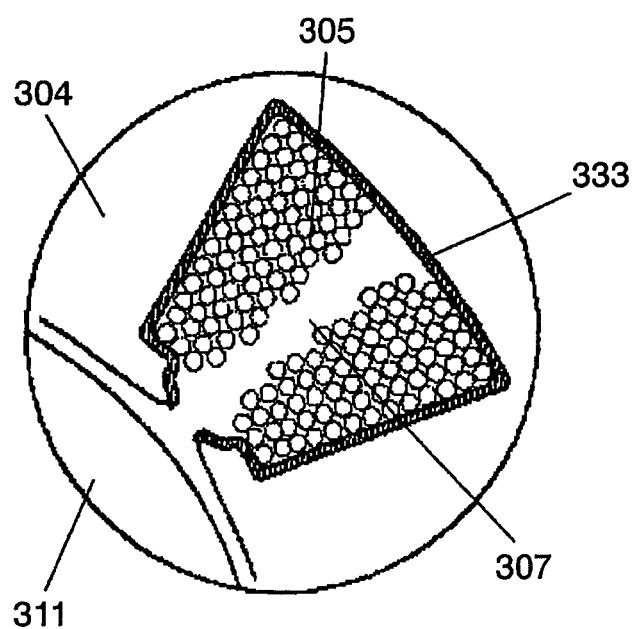
FIG. 13 is an enlarged view of an essential portion in FIG. 12.
Figure 14:
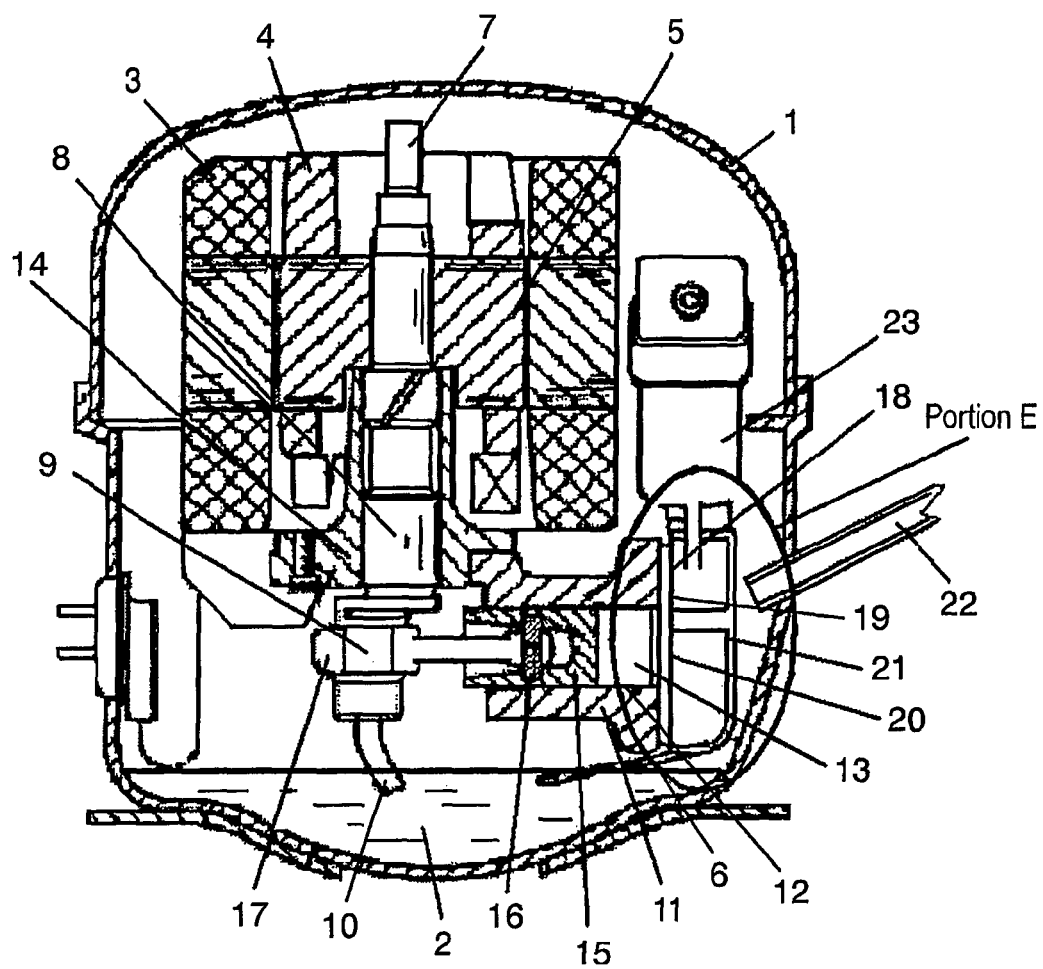
FIG. 14 is a sectional view of a conventional refrigerant compressor.
Figure 15:
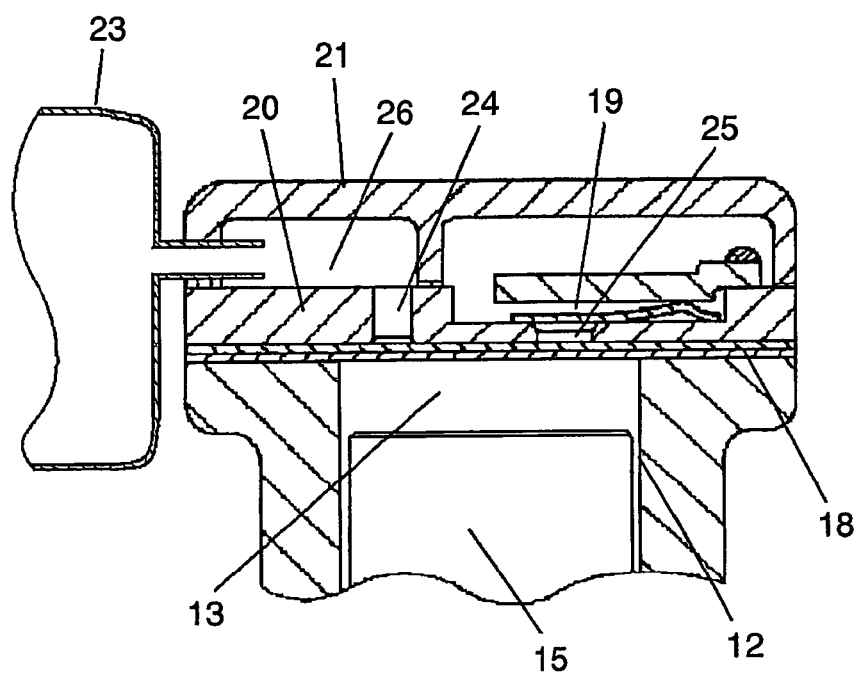
FIG. 15 is an enlarged sectional view of portion E in FIG. 14.

FIG. 10 is a schematic diagram of a refrigerant compressor in the preferred embodiment of the present invention. FIG. 11 is an enlarged view of portion C in FIG. 10. FIG. 12 is a sectional view along line 12-12 in FIG. 10. FIG. 13 is an enlarged view of an essential portion in FIG. 12.

In FIG. 10 to FIG. 13, hermetic container 301 internally stores oil 302 of VG8 in viscosity which is formed of single mineral oil nearly equal in evaporation temperature, and also comprises compression mechanism 303 and concentrated winding inverter type electric motor 304 for driving the compression mechanism 303. Also, the refrigerant used is R600a.

Electric motor 304 is configured in that main coil 305 in which the current supplied from a commercial power source (not shown) flows via power circuit (not shown) is wound in such manner as to pass through adjacent slot 307. Slot 307 and main coil 305 are insulated by insulator 333 inserted into slot 307 from top and bottom so as to cover the end of electric motor 304 and the inner wall of slot 307. The material for the insulator, insulator 333, is PPS (polyphenylene sulfide) that is less in amount of oligomer contained.

Crank shaft 310 is formed of main shaft 312, and eccentric member 314, and at the bottom thereof, there is provided oil feeding pump 315 connected to oil 302. Rotor 311 of electric motor 304 is press-fitted on main shaft 312. Eccentric member 314 is formed eccentrically of main shaft 312 above the main shaft 312. Cylinder block 316 has compression chamber 318 formed of generally cylindrical bore 317, which also includes main bearing 319 which supports main shaft 312.

Piston 321 movably fitted in bore 317 is connected to eccentric member 314 by a connecting means, connecting rod 323, via piston pin 322.

Valve plate 324 is disposed so as to seal the end of bore 317, and formed with suction hole 325 and discharge hole 326. Suction reed 327 formed from plate-spring material is held between the end of bore 317 and valve plate 324, and serves to open and close the suction hole 325. Discharge reed 328 formed from plate-spring material is disposed at the opposite to bore side of valve plate 324, and serves to open and close the discharge hole 326. Head 329 is fixed at the opposite to bore side of valve plate 324, and forms high pressure chamber 330 which accommodates discharge reed 328.

Suction tube 331 is fixed on hermetic container 301 and is also connected to the low pressure side (not shown) of the refrigeration cycle in order to lead the refrigerant gas (not shown) into hermetic container 301. Suction muffler 332 is held between valve plate 324 and head 329.

Sliding surfaces are formed between main shaft 312 of crank shaft 310 and main bearing 319, between piston 321 and bore 317, between piston pin 322 and connecting rod 323, and between eccentric member 314 of crank shaft 310 and connecting rod 323.

The operation and effect of a compressor having the above configuration will be described in the following.

The power supplied from a commercial power source (not shown) is supplied to electric motor 304 via power circuit (not shown), which rotates rotor 311 of electric motor 304. Rotor 311 rotates crank shaft 310, and the eccentric motion of eccentric member 314 is transmitted from the connecting means, connecting rod 323, to drive the piston 321 via piston pin 322, and thereby, piston 321 makes a reciprocating motion in bore 317.

As piston 321 reciprocates in bore 317 and the pressure in compression chamber 318 is lowered during the suction process, the refrigerant gas led into hermetic container 301 through suction tube 331 opens the suction reed 327 via suction muffler 332 and is sucked up into compression chamber 318 from suction hole 325. The refrigerant gas sucked up into compression chamber 318 is continuously compressed and opens the discharge reed 328 and is discharged from discharge hole 326 into high pressure chamber 330, which is then delivered to the high pressure side (not shown) of the refrigeration cycle.

Oil 302 is fed from oil feeding pump 315 to each sliding surface as crank shaft 310 is rotated, which lubricates the sliding surfaces formed between main shaft 312 and main bearing 319, between piston 321 and bore 317, between piston pin 322 and connecting rod 323, and between eccentric member 314 and connecting rod 323, and also serves the function as a seal between piston 321 and bore 317.

When the viscosity of oil 302 used is VG8, the reduction of friction coefficient at sliding surfaces and the reduction of viscous resistance with lowering of the viscosity of oil 302 greatly contribute to the input reduction of the refrigerant compressor, thereby greatly improving the efficiency of the refrigerant compressor.

Also, oil 302 is splashed to hermetic container 301 and compression mechanism 303 from above the crack shaft 310, and part of the oil drips onto electric motor 304. Also, mist-like oil 302 exists in hermetic container 301, which sticks to the inner wall of hermetic container 301, compression mechanism 303, and electric motor 304.

Oil 302 dripped and adhered to electric motor 304 extracts oligomer from insulator 333, and the amount of oligomer extracted becomes more increased when oil 302 is lower in viscosity. However, since PPS (polyphenylene sulfide) being less in amount of oligomer contained is used as insulator 333 of electric motor 304 used in the present preferred embodiment, the amount of oligomer extracted is suppressed even when low-viscosity oil 302 is used. Therefore, even in case oil 302 is evaporated due to considerable decrease of the pressure in compression chamber 318, it is possible to suppress the deposition of oiligomer.

Also, even when oil 302 is evaporated at discharge reed 328 or the like where the temperature becomes high, the deposition of oligomer can be similarly suppressed. As a result, defective compression causing hindrance to the sealing effects of suction reed 327 and discharge reed 328 can be suppressed and it is possible to enhance the reliability.

INDUSTRIAL APPLICABILITY

The refrigerant compressor of the present invention may assure high reliability while using low-viscosity lubricant, which is therefore widely applicable for an apparatus using a refrigeration cycle.

REFERENCE NUMERALS IN THE DRAWINGS 101, 201, 301 Hermetic container
102 Refrigerant gas
103, 202, 302 Oil
107, 203, 303 Compression mechanism
204, 304 Electric motor
208 Interlayer insulating paper
209 Slot insulating paper
210, 310 Crank shaft
216, 316 Cylinder block
221, 321 Piston
333 Insulator

The invention claimed is:

1. A refrigerant compressor, comprising:
a hermetic container which internally stores a blended oil formed of a plurality of component oils and also accommodates a compression mechanism for compressing refrigerant gas,
wherein the blended oil ranges from a viscosity grade not lower than ISO VG3 to a viscosity grade not higher than ISO VG8, and
a first component oil includes a first characteristic having a boiling point at 350° C. or over which is not less than 10% and not higher than 30% in volume ratio, and a second component oil includes a characteristic having a boiling point at 300° C. or less which is not less than 50% and not higher than 70% in volume ratio.

2. The refrigerant compressor of claim 1,
wherein the refrigerant is one of R600a and a mixture whose main component is R600a, and
the blended oil is one of mineral oil and synthetic oil.

3. The refrigerant compressor of claim 1,
wherein phosphorous extreme-pressure additive is added to the blended oil.

4. The refrigerant compressor of claim 1,
wherein the compression mechanism is a reciprocating compression mechanism.

5. The refrigerant compressor of claim 1,
further comprising an electric motor for driving the compression mechanism,
wherein a low-oligomer type insulating material is used as an insulating material for the electric motor.

6. The refrigerant compressor of claim 5,
wherein a component oil of the plurality of component oils is about equal in evaporation temperature to an evaporation temperature of the blended oil.

7. The refrigerant compressor of claim 5,
wherein the electric motor is a distributed-winding motor.

8. The refrigerant compressor of claim 5,
wherein the electric motor is a concentrated-winding motor.

* * * * *